US007642763B2

(12) United States Patent
Lu et al.

(10) Patent No.: US 7,642,763 B2
(45) Date of Patent: Jan. 5, 2010

(54) SWITCHING POWER SUPPLY CIRCUIT HAVING INDEPENDENT LOOPS

(75) Inventors: Jian-Hui Lu, Shenzhen (CN); Tong Zhou, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 46 days.

(21) Appl. No.: 12/005,798

(22) Filed: Dec. 27, 2007

(65) Prior Publication Data

US 2008/0157691 A1 Jul. 3, 2008

(30) Foreign Application Priority Data

Dec. 29, 2006 (TW) .............................. 95149710 A

(51) Int. Cl.
*G05F 1/00* (2006.01)
(52) U.S. Cl. .................. 323/282; 323/351; 323/361; 315/319; 315/226; 315/276; 315/291
(58) Field of Classification Search ............. 315/209 R, 315/210, 213, 216, 220, 224–226, 247, 255–256, 315/277, 291; 363/16–17, 21.01, 21.11, 363/95–97, 131–132; 323/271, 282, 345, 323/351, 361
See application file for complete search history.

(56) References Cited

U.S. PATENT DOCUMENTS

| 6,288,912 | B1 | 9/2001 | Bedouet |
| 6,404,176 | B1 * | 6/2002 | Winick et al. ................ 323/305 |
| 6,853,153 | B2 * | 2/2005 | Gray ........................... 315/291 |
| 6,917,188 | B2 * | 7/2005 | Kernahan ................... 323/282 |
| 7,394,209 | B2 * | 7/2008 | Lin et al. .................... 315/247 |
| 2003/0026112 | A1 * | 2/2003 | Winick et al. ................. 363/24 |
| 2005/0067973 | A1 * | 3/2005 | Beij et al. ............... 315/209 R |

* cited by examiner

*Primary Examiner*—David Hung Vu
*Assistant Examiner*—Tung X Le
(74) *Attorney, Agent, or Firm*—Wei Te Chung

(57) ABSTRACT

An exemplary switching power supply circuit (2) includes a power source (20), a pulse width modulation (PWM) circuit (21), a first switching circuit (22), a second switching circuit (23), a first transformer (25), and a second transformer (26). The first switching circuit includes a first transistor (221) and a second transistor (222). The second switching circuit includes a third transistor (231) and a fourth transistor (232). The first transformer includes a first primary winding (251) and a second primary winding (252), and the second transformer includes a third primary winding (261) and a fourth primary winding (262). The switching circuits are controlled by pulse signals from the PWM circuit. When the first and third transistors are switched on, the power source, the first primary winding, and the first transistor form a first closed loop. The power source, the third primary winding, and the third transistor form a second closed loop.

20 Claims, 2 Drawing Sheets

SWITCHING POWER SUPPLY CIRCUIT HAVING INDEPENDENT LOOPS

FIELD OF THE INVENTION

The present invention relates to switching power supply circuits typically used in liquid crystal displays (LCDs), and particularly to a switching power supply circuit having independent loops.

GENERAL BACKGROUND

Switching power supply circuits are widely used in coordination with various portable and automated electronic devices and instruments such as LCDs. Referring to FIG. 2, a typical switching power supply circuit 1 includes a power source 10, a pulse width modulation (PWM) circuit 11, a first switching circuit 12, a second switching circuit 13, a first transformer 15, a second transformer 16, and two filter circuits 14.

Each filter circuit 14 includes a resistor 141 and a series capacitor 142. The PWM circuit 11 includes a first output 111 and a second output 112. The first switching circuit 12 includes a first transistor 121 and a second transistor 122. Source electrodes of the first transistor 121 and the second transistor 122 are connected to ground. Gate electrodes of the first transistor 121 and the second transistor 122 are connected to the first output 111. The first output 111 is configured to output pulse voltages to switch on and switch off the first transistor 121 and the second transistor 122. The first and second transistors 121, 122 are metal-oxide-semiconductor field-effect transistors (MOSFETs).

The second switching circuit 13 includes a third transistor 131 and a fourth transistor 132. Source electrodes of the third transistor 131 and the fourth transistor 132 are connected to ground. Gate electrodes of the third transistor 131 and the fourth transistor 132 are connected to the second output 112. The second output 112 is configured to output pulse voltages to switch on and switch off the third transistor 131 and the fourth transistor 132. The third and fourth transistors 131, 132 are MOSFETs.

The first transformer 15 includes a first primary winding 151, a second primary winding 152, and a first secondary winding 154. The first primary winding 151 and the second primary winding 152 have a first common terminal 153. The first common terminal 153 is connected to the power source 10, and is further connected to ground via the filter circuit 14. The first primary winding 151 further includes a first terminal (not labeled). The second primary winding 152 further includes a second terminal (not labeled).

The second transformer 16 includes a third primary winding 161, a fourth primary winding 162, and a second secondary winding 164. The third primary winding 161 and the fourth primary winding 162 have a second common terminal 163. The second common terminal 163 is connected to the power source 10, and is further connected to ground via the filter circuit 14. The third primary winding 161 further includes a third terminal (not labeled). The fourth primary winding 162 further includes a fourth terminal (not labeled).

The first terminal of the first transformer 15 and the third terminal of the second transformer 16 are connected to ground via a first capacitor (not labeled), and are further connected to drain electrodes of the first transistor 121 and the second transistor 122. The second terminal of the first transformer 15 and the fourth terminal of the second transformer 16 are connected to ground via a second capacitor (not labeled), and are further connected to drain electrodes of the third transistor 131 and the fourth transistor 132.

When the switching power supply circuit 1 works, the first output 111 and the second output 112 provide pulse voltages to the first and second switching circuits 12, 13 respectively. When the pulse voltage provided by the first output 111 is a high voltage, the pulse voltage provided by the second output 112 is a low voltage. That is, when the first transistor 121 and the second transistor 122 of the first switching circuit 12 are switched on, the third transistor 131 and the fourth transistor 132 of the second switching circuit 13 are switched off, and vice versa. Because the two transistors 121 and 122 of the first switching circuit 12 are simultaneously switched on, the two transistors 121 and 122 may be damaged or even destroyed by heat generated thereat after the two transistors 121 and 122 have been working for a long time. The two transistors 131 and 132 of the second switching circuit 13 have the same problem.

Furthermore, when the first switching circuit 12 is switched on, and the second switching circuit 13 is switched off, the power source 10, the first primary winding 151 and the first switching circuit 12 form a closed loop, and the power source 10, the third primary winding 161 and the first switching circuit 12 also form a closed loop. The first primary winding 151 and the third primary winding 161 are connected to ground in parallel via the first switching circuit 12. Thus, the parallel first and second primary windings 151, 161 electromagnetically interfere with each other. Therefore, the outputs of the first and second secondary windings 154, 164 are liable to be non-uniform and unstable.

Similarly, when the second switching circuit 13 is switched on, and the first switching circuit 12 is switched off, the power source 10, the second primary winding 152 and the second switching circuit 13 form a closed loop, and the power source 10, the fourth primary winding 162 and the second switching circuit 13 also form a closed loop. The second primary winding 152 and the fourth primary winding 162 are connected to ground in parallel via the second switching circuit 13. Thus, the parallel second and fourth primary windings 151, 161 electromagnetically interfere with each other. Therefore, the outputs of the first and second secondary windings 154, 164 are liable to be non-uniform and unstable.

In summary, due to the above-described factors, the reliability and quality of the switching power supply circuit 1 may be unsatisfactory.

What is needed, therefore, is a switching power supply circuit that can overcome the above-described deficiencies.

SUMMARY

In one preferred embodiment, a switching power supply circuit includes a power source, a pulse width modulation (PWM) circuit, a first switching circuit, a second switching circuit, a first transformer and a second transformer. The PWM circuit includes a first output and a second output. The first switching circuit includes a first transistor and a second transistor. The second switching circuit includes a third transistor and a fourth transistor. The first transformer includes a first primary winding and a second primary winding, and the second transformer includes a third primary winding and a fourth primary winding. The first and second switching circuits are controlled by pulse signals provided by the PWM circuit. When the first and third transistors are switched on, the power source, the first primary winding, and the first transistor form a first closed loop. The power source, the third primary winding, and the third transistor form a second closed loop. When the second and fourth transistors are switched on, the power source, the second primary winding, and the second transistor form a third closed loop. The power source, the fourth primary winding, and the fourth transistor form a fourth closed loop.

Other novel features and advantages of the present switching power supply circuit will become more apparent from the following detailed description when taken in conjunction with the accompanying drawings.

DETAILED DESCRIPTION OF PREFERRED EMBODIMENTS

Figure 1:
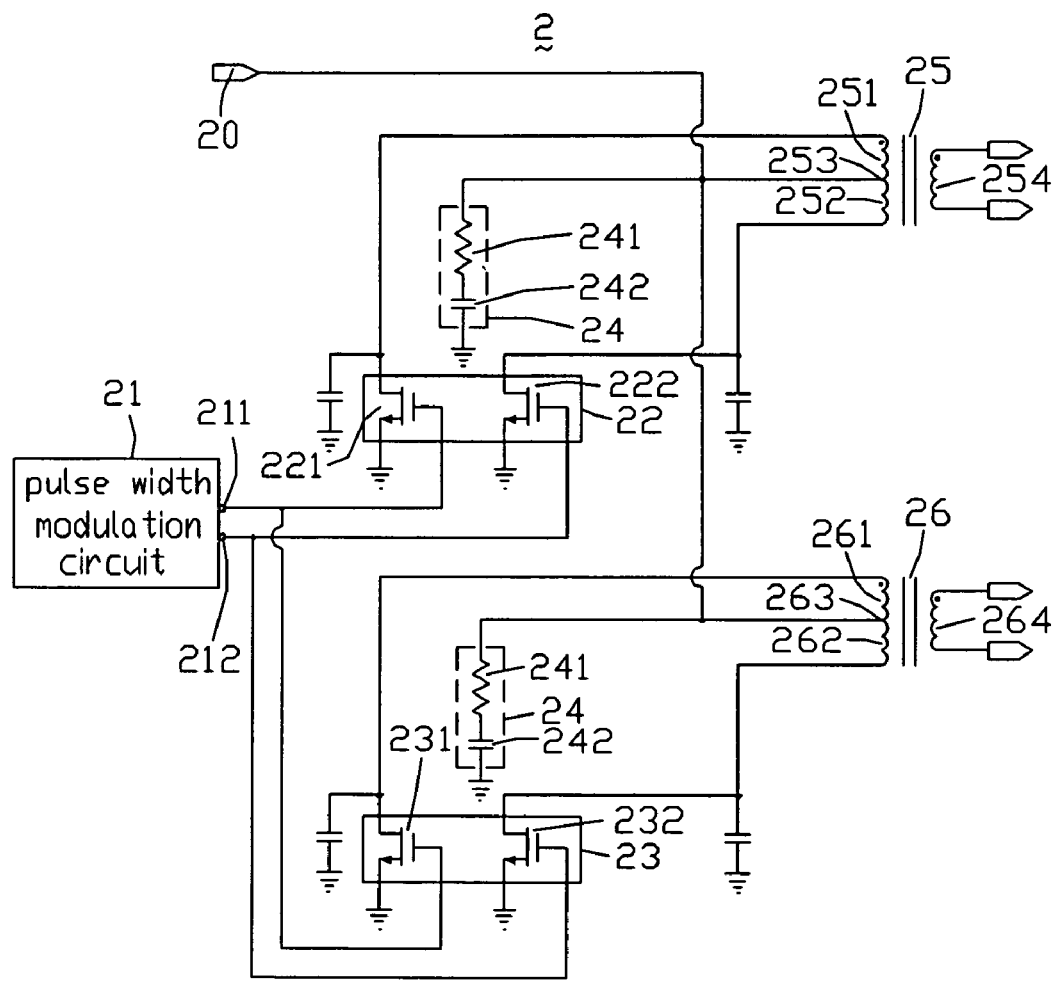
FIG. 1 is a circuit diagram of a switching power supply circuit according to an exemplary embodiment of the prevent invention.
Figure 2:
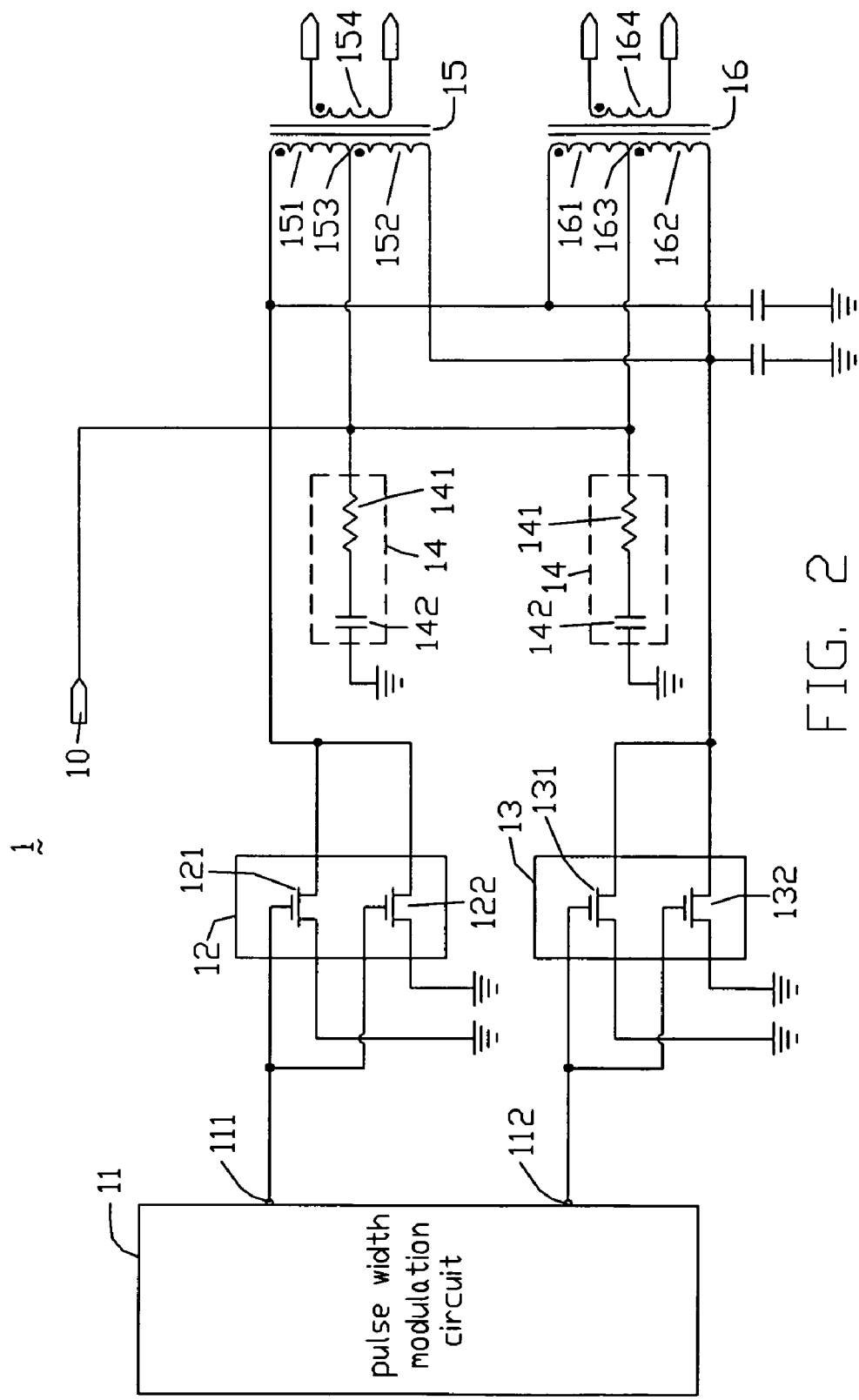
FIG. 2 is a circuit diagram of a conventional switching power supply circuit.

Reference will now be made to the drawing figures to describe various embodiments of the present invention in detail.

Referring to FIG. 1, a switching power supply circuit 2 according to an exemplary embodiment of the present invention is shown. The switching power supply circuit 2 includes a power source 20, a pulse width modulation (PWM) circuit 21, a first switching circuit 22, a second switching circuit 23, a first transformer 25, a second transformer 26, and two filter circuits 24. The power source 20 supplies a 10 volt (V) direct current voltage.

Each filter circuit 24 includes a resistor 241 and a series capacitor 242. The PWM circuit 21 includes a first output 211 and a second output 212. The first and second outputs 211, 212 alternately provide pulse voltages to the first and second switching circuits 22, 23.

The first switching circuit 22 includes a first transistor 221 and a second transistor 222. Source electrodes of the first transistor 221 and the second transistor 222 are connected to ground. A gate electrode of the first transistor 221 is connected to the first output 211. A gate electrode of the second transistor 222 is connected to the second output 212. The first and second outputs 211, 212 are configured to output pulse voltages to switch on and switch off the first transistor 221 and the second transistor 222. The first and second transistors 221, 222 are typically MOSFETs.

The second switching circuit 23 includes a third transistor 231 and a fourth transistor 232. Source electrodes of the third transistor 231 and the fourth transistor 232 are connected to ground. A gate electrode of the third transistor 231 is connected to the first output 211. A gate electrode of the fourth transistor 232 is connected to the second output 212. The first and second outputs 211, 212 output pulse voltages to switch on and switch off the third transistor 231 and the fourth transistor 232. The third and fourth transistors 231, 232 are typically MOSFETs.

The first transformer 25 includes a first primary winding 251, a second primary winding 252, and a first secondary winding 254. The first primary winding 251 and the second primary winding 252 have a first common terminal 253. The first common terminal 253 is connected to the power source 20, and is further connected to ground via the filter circuit 24. The first primary winding 251 further includes a first terminal (not labeled). The second primary winding 252 further includes a second terminal (not labeled).

The second transformer 26 includes a third primary winding 261, a fourth primary winding 262, and a second secondary winding 264. The third primary winding 261 and the fourth primary winding 262 have a second common terminal 263. The second common terminal 263 is connected to the power source 20, and is further connected to ground via the filter circuit 24. The third primary winding 261 further includes a third terminal (not labeled). The fourth primary winding 262 further includes a fourth terminal (not labeled). In a typical application of the switching power supply circuit 2, the switching power supply circuit 2 is employed in an LCD. In such case, the first and second secondary windings 254, 264 are configured to provide voltages to lamps of the LCD. The lamps may for example be cold cathode fluorescent lamps (CCFLs).

The first terminal of the first primary winding 251 is connected to a drain electrode of the first transistor 221, and is further connected to ground via a first capacitor (not labeled). The second terminal of the second primary winding 252 is connected to a drain electrode of the second transistor 222, and is further connected to ground via a second capacitor (not labeled). The third terminal of the third primary winding 261 is connected to a drain electrode of the third transistor 231, and is further connected to ground via a third capacitor (not labeled). The fourth terminal of the fourth primary winding 261 is connected to a drain electrode of the fourth transistor 232, and is further connected to ground via a fourth capacitor (not labeled). The first, second, third and fourth capacitors are filter capacitors, and have the same capacitance.

When the switching power supply circuit 2 works, the first output 211 and the second output 212 provide pulse voltages to the first and second switching circuits 22, 23. When the pulse voltage provided by the first output 211 is a high voltage, the pulse voltage provided by the second output 212 is a low voltage, and vice versa. That is, when the first transistor 221 and the third transistor 231 are switched on, the second transistor 222 and the fourth transistor 232 are switched off, and vice versa.

When the first output 211 provides a high voltage, the first transistor 221 of the first switching circuit 22 and the third transistor 231 of the second switching circuit 23 are switched on. The power source 20, the first primary winding 251 and the first transistor 221 of the first switching circuit 22 form a first closed loop. The power source 20, the third primary winding 261 and the third transistor 231 of the second switching circuit 23 form a second closed loop.

Similarly, when the second output 212 provides a high voltage, the second transistor 222 of the first switching circuit 22 and the fourth transistor 232 of the second switching circuit 23 are switched on. The power source 20, the second primary winding 252 and the second transistor 222 of the first switching circuit 22 form a third closed loop. The power source 20, the fourth primary winding 262 and the fourth transistor 232 of the second switching circuit 23 form a fourth closed loop.

The first closed loop and the second closed loop work independently of each other, and the third closed loop and the fourth closed loop work independently of each other. Thereby, electromagnetic interference between the first closed loop and the second closed loop is avoided, and electromagnetic interference between the third closed loop and the fourth closed loop is avoided. Therefore, unlike with a conventional switching power supply circuit, outputs of the first and second secondary windings 254, 264 can be uniform and stable.

Furthermore, when the first and second closed loops of the switching power supply circuit 2 work, only the first transistor 221 of the first switching circuit 22 and the third transistor 231 of the second switching circuit 23 are working. The second transistor 222 of the first switching circuit 22 and the fourth transistor 232 of the second switching circuit 23 remain idle. Therefore heat generated by each of the switching circuits 22, 23 is reduced. Similarly, when the third and the fourth closed loops of the switching power supply circuit 2 work, only the second transistor 222 of the first switching circuit 22 and the fourth transistor 232 of the second switching circuit 23 are working. The first transistor 221 of the first switching circuit 22 and the third transistor 231 of the second switching circuit 23 remain idle. Therefore heat generated by each of the switching circuits 22, 23 is reduced. Thus, the switching power supply circuit 2 is not prone to sustain damage, even when the switching power supply circuit 2 works for an extended period of time.

With the above-described advantages, the switching power supply circuit 2 is able to provide high quality and reliable performance.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switching power supply circuit, comprising:
   a power source;
   a pulse width modulation (PWM) circuit, comprising a first output and a second output;
   a first switching circuit and a second switching circuit, the first switching circuit comprising a first transistor and a second transistor, the second switching circuit comprising a third transistor and a fourth transistor, the first and second switching circuits being controlled by pulse signals provided by the first and second outputs of the PWM circuit; and
   a first transformer and a second transformer, the first transformer comprising a first primary winding and a second primary winding, the second transformer comprising a third primary winding and a fourth primary winding;
   wherein when the first output supplies a high voltage, the first transistor and the third transistor are switched on, the power source, the first primary winding, and the first transistor form a first closed loop, and the power source, the second primary winding, and the third transistor form a second closed loop; and
   when the second output supplies a high voltage, the second and fourth transistors are switched on, the power source, the second primary winding, and the second transistor form a third closed loop, and the power source, the fourth primary winding and the fourth transistor form a fourth closed loop.

2. The switching power supply circuit as claimed in claim 1, wherein the first primary winding arid the second primary winding of the first transformer have a first common terminal, the first primary winding further comprising a first terminal, and the second primary winding further comprising a second terminal.

3. The switching power supply circuit as claimed in claim 2, wherein the first and second terminals are connected to drain electrodes of the first and second transistors of the first switching circuit respectively, and the first common terminal is connected to ground.

4. The switching power supply circuit as claimed in claim 2, wherein the third primary winding and the fourth primary winding of the second transformer have a second common terminal, the third primary winding further comprising a third terminal, and the fourth primary winding further comprising a fourth terminal.

5. The switching power supply circuit as claimed in claim 4, wherein the third and fourth terminals are connected to drain electrodes of the third and fourth transistors of the second switching circuit respectively, and the second common terminal is connected to ground.

6. The switching power supply circuit as claimed in claim 5, wherein gate electrodes of the first and third transistors are connected to the first output, and gate electrodes of the second and fourth transistors are connected to the second output.

7. The switching power supply circuit as claimed in claim 6, wherein source electrodes of the four transistors are connected to ground.

8. The switching power supply circuit as claimed in claim 4, further comprising two filter circuits, the first and second common terminals being connected to ground via the filter circuits respectively.

9. The switching power supply circuit as claimed in claim 8, wherein each of the filter circuits comprises a resistor and a series capacitor.

10. The switching power supply circuit as claimed in claim 4, wherein each of the first, second, third, and fourth terminals of the first and second transformers is connected to ground via a respective capacitor.

11. The switching power supply circuit as claimed in claim 4, wherein the first transformer further comprises a first secondary winding, and the second transformer further comprises a second secondary winding.

12. The switching power supply circuit as claimed in claim 11, wherein the first secondary winding and the second secondary winding are configured to provide voltages to a plurality of cold cathode fluorescent lamps (CCFLs).

13. The switching power supply circuit as claimed in claim 1, wherein the power source supplies a 10 V direct current voltage.

14. The switching power supply circuit as claimed in claim 1, wherein the first and second outputs provide pulse voltages.

15. The switching power supply circuit as claimed in claim 14, wherein when the first output provides a high voltage, the second output provides a low voltage, and when the first output provides a low voltage, the second output provides a high voltage.

16. The switching power supply circuit as claimed in claim 1, wherein the transistors are metal-oxide-semiconductor field-effect transistors (MOSFETs).

17. A switching power supply circuit, comprising:
   a power source;
   a pulse width modulation (PWM) circuit comprising a first output and a second output;
   a first switching circuit comprising a first transistor and a second transistor;
   a second switching circuit comprising a third transistor and a fourth transistor;
   a first transformer comprising a first primary winding and a second primary winding, the first primary winding and the second primary winding comprising a first common terminal, the first primary winding further comprising a first terminal, and the second primary winding further comprising a second terminal; and
   a second transformer comprising a third primary winding and a fourth primary winding, the third primary winding and the fourth primary winding comprising a second common terminal, the third primary winding further comprising a third terminal, and the fourth primary winding further comprising a fourth terminal;

wherein the first output of the PWM circuit is connected to gate electrodes of the first and third transistors respectively, the second output of the PWM circuit is connected to gate electrodes of the second and fourth transistors respectively, the power source is connected to the first and second common terminals respectively, the first and second terminals are connected to drain electrodes of the first and second transistors respectively, and the third and fourth terminals are connected to drain electrodes of the third and the fourth transistors respectively.

18. The switching power supply circuit as claimed in claim 17, wherein the transistors are metal-oxide-semiconductor field-effect transistors (MOSFETs).

19. The switching power supply circuit as claimed in claim 17, funkier comprising two filter circuits, each of the filter circuits comprising a resistor and a series capacitor, the first and second common terminals being connected to ground via the filter circuits respectively.

20. The switching power supply circuit as claimed in claim 17, wherein each of the first, second, third, and fourth terminals of the first and second transformers is connected to ground via a respective capacitor.

* * * * *